United States Patent [19]
Pinkerton

[11] Patent Number: 5,864,198
[45] Date of Patent: Jan. 26, 1999

[54] BRUSHLESS GENERATOR

[75] Inventor: Joseph Frank Pinkerton, Austin, Tex.

[73] Assignee: Active Power, Inc., Austin, Tex.

[21] Appl. No.: 836,564

[22] PCT Filed: Oct. 12, 1995

[86] PCT No.: PCT/US95/13472

§ 371 Date: May 2, 1997

§ 102(e) Date: May 2, 1997

[87] PCT Pub. No.: WO96/12337

PCT Pub. Date: Apr. 25, 1996

Related U.S. Application Data

[63] Continuation-in-part of Ser. No. 324,069, Oct. 14, 1994, abandoned.

[51] Int. Cl.$^6$ ................................................ H02K 1/22
[52] U.S. Cl. ........................... 310/266; 310/156; 310/261; 310/112; 310/179; 310/180; 310/181; 310/184
[58] Field of Search ..................... 310/156, 261, 310/266, 112, 179, 180, 181, 184

[56] References Cited

U.S. PATENT DOCUMENTS

| | | | |
|---|---|---|---|
| 2,428,781 | 10/1947 | Bowlus | 310/156 |
| 3,428,840 | 2/1969 | Kober | 310/268 |
| 3,484,635 | 12/1969 | MacKallor, Jr. | 310/266 |
| 3,493,800 | 2/1970 | Barrett | 310/168 |
| 3,571,639 | 3/1971 | Tiltins | 310/168 |
| 3,686,523 | 8/1972 | Gorden et al. | 310/72 |
| 3,771,046 | 11/1973 | Harter | 327/63 |
| 4,075,519 | 2/1978 | Mrcun | 310/67 R |
| 4,292,532 | 9/1981 | Leroux | 290/6 |
| 4,508,998 | 4/1985 | Hahn | 318/138 |
| 4,528,493 | 7/1985 | Spencer et al. | 322/99 |
| 4,559,486 | 12/1985 | Spencer et al. | 322/99 |
| 4,611,139 | 9/1986 | Godkin et al. | 310/266 |
| 4,647,806 | 3/1987 | Giuffrida | 310/68 D |
| 4,654,551 | 3/1987 | Farr | 310/112 |
| 4,691,133 | 9/1987 | Mongeau | 310/178 |
| 4,723,106 | 2/1988 | Gibbs et al. | 322/26 |
| 4,745,318 | 5/1988 | Ivanics | 310/114 |
| 4,831,300 | 5/1989 | Lindgren | 310/190 |
| 4,887,020 | 12/1989 | Graham | 322/63 |
| 4,900,965 | 2/1990 | Fisher | 310/216 |
| 4,918,343 | 4/1990 | Heinrich et al. | 310/58 |
| 4,924,128 | 5/1990 | Vaillant De Guelis et al. | 310/156 |
| 4,939,441 | 7/1990 | Dhyanchand | 318/718 |
| 5,006,741 | 4/1991 | Schott | 310/68 D |
| 5,012,145 | 4/1991 | Frantz et al. | 310/68 D |
| 5,030,867 | 7/1991 | Yamada et al. | 310/156 |
| 5,039,932 | 8/1991 | Belanger et al. | 322/22 |
| 5,065,484 | 11/1991 | Pinchott | 29/25.02 |
| 5,083,077 | 1/1992 | Wallace et al. | 322/22 |
| 5,091,679 | 2/1992 | Murty et al. | 318/153 |
| 5,097,169 | 3/1992 | Fukushima et al. | 310/263 |
| 5,136,195 | 8/1992 | Allen, III et al. | 310/68 D |
| 5,177,390 | 1/1993 | Van Maaren | 310/183 |
| 5,184,040 | 2/1993 | Lim | 310/114 |
| 5,210,452 | 5/1993 | Pratap et al. | 310/12 |
| 5,311,092 | 5/1994 | Fisher | 310/266 |
| 5,331,244 | 7/1994 | Rabe | 310/180 |

FOREIGN PATENT DOCUMENTS 954 978   12/1956   Germany ............................... 310/156

Primary Examiner—Nestor Ramirez
Assistant Examiner—Elvin G. Enad
Attorney, Agent, or Firm—Fish & Neave; Robert W. Morris

[57] ABSTRACT

A brushless generator provides increased output by providing air-core coils (936,956) in place of ferrous coils in regions of the generator which operate at high frequencies. The air-core coils (936,956) enable the generator to rotate at speeds in excess of 24,000 rpm while continuing to operate efficiently because core losses, due to the use of traditional iron cores (e.g., hysteresis and eddy-currents), are virtually eliminated. In preferred embodiments, rotating air-core coils (936) pass through stationary electromagnet fields (920) that induce amplified AC currents in the coils. The AC currents are rectified (950) and fed to rotating electromagnets (922) which create rotating fields. A second set of air-core coils (956) is oriented such that they pass through the rotating fields, which induce an AC voltage which may be used as the output of the generator.

39 Claims, 6 Drawing Sheets

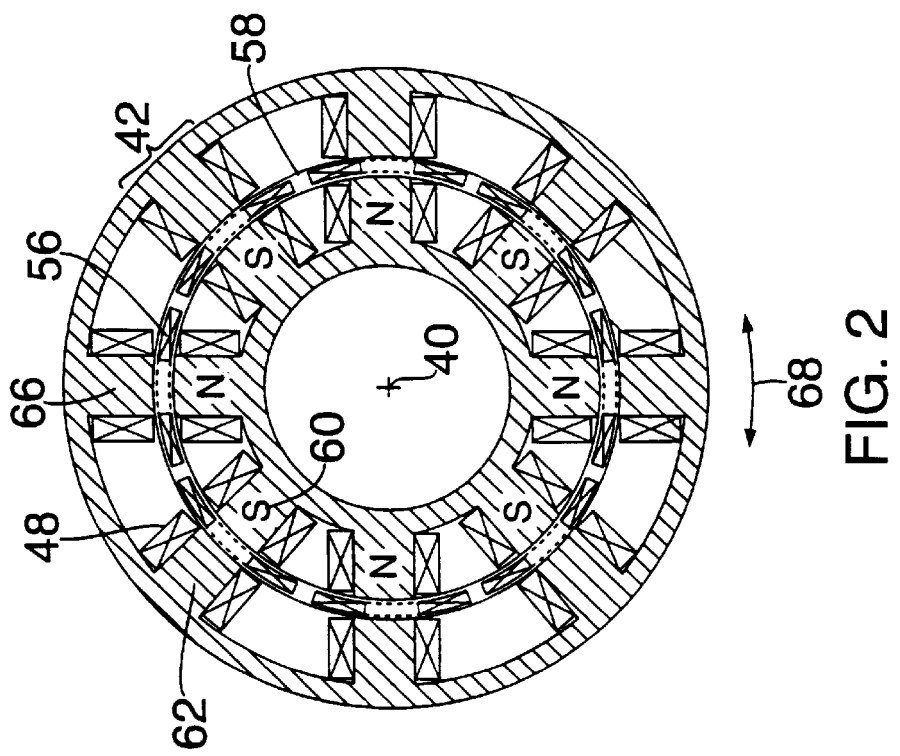
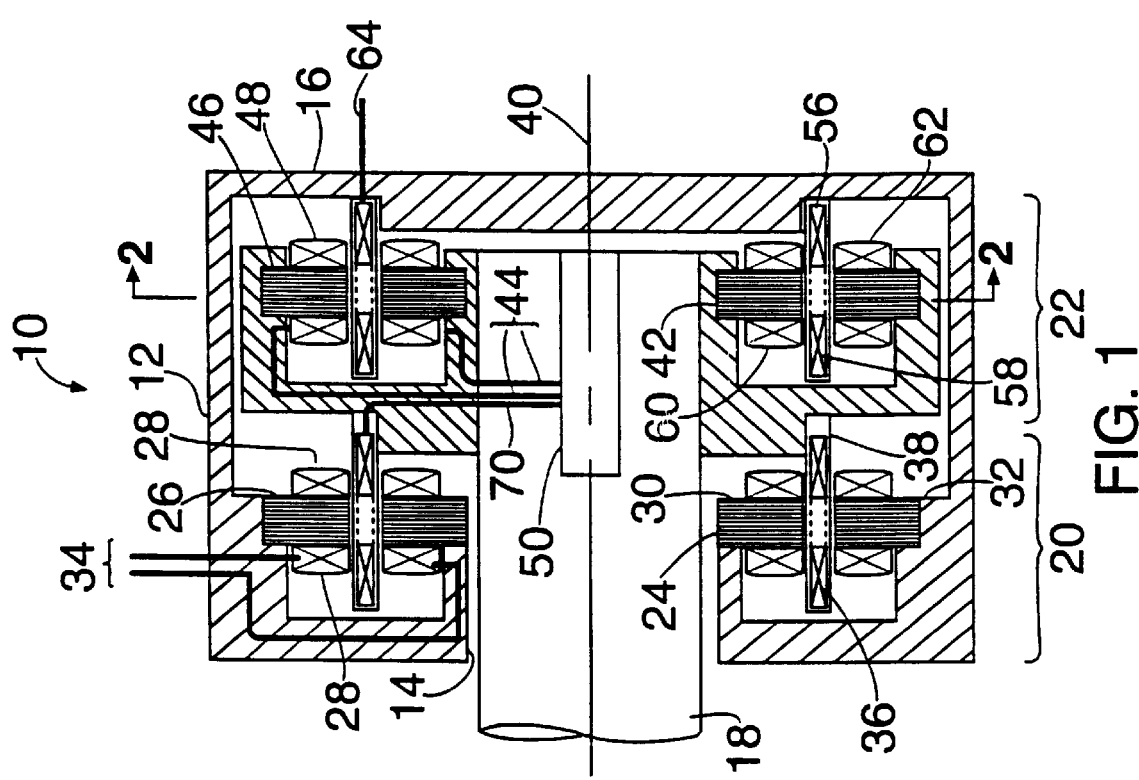

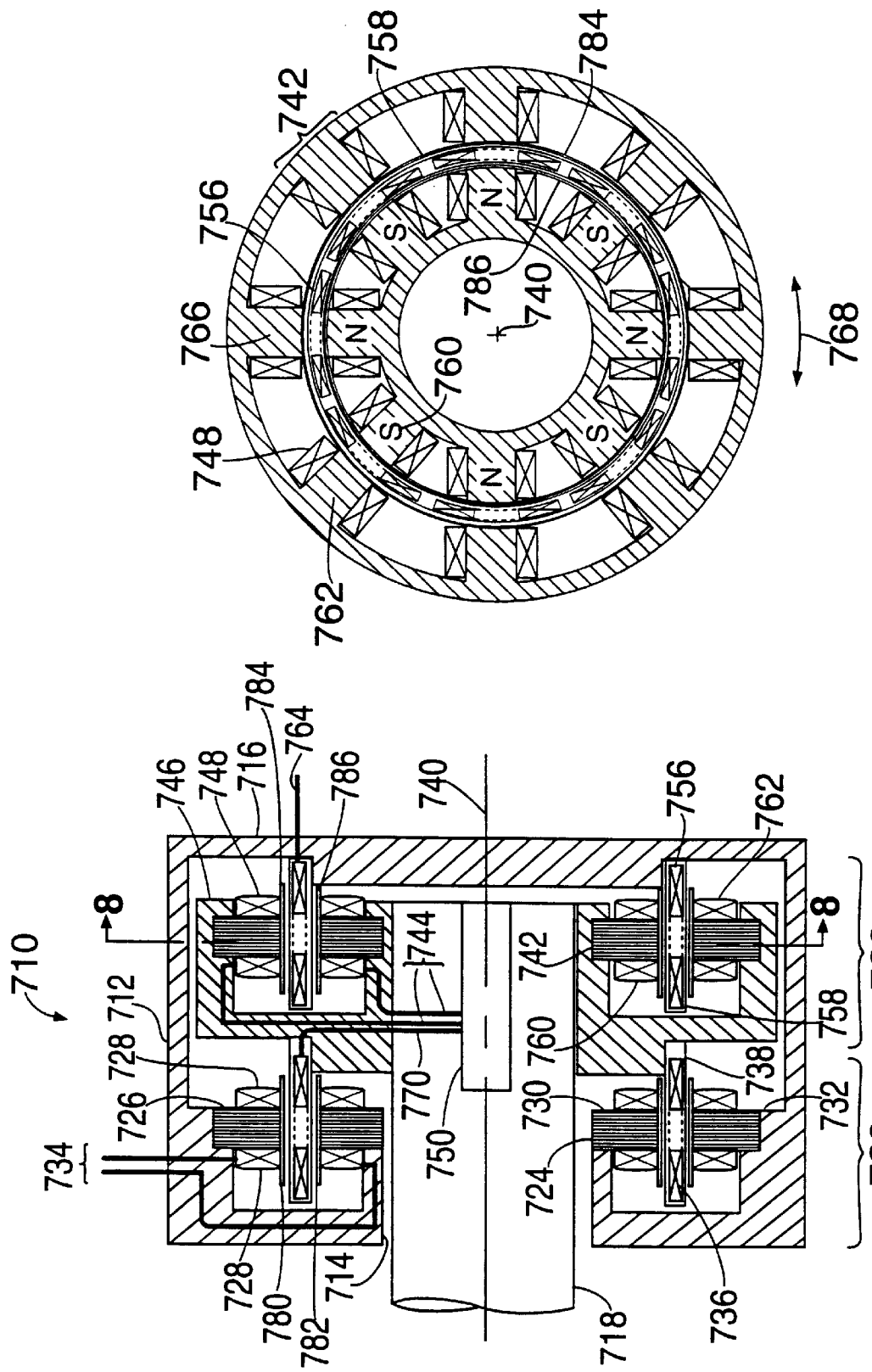

BRUSHLESS GENERATOR

CROSS REFERENCE TO RELATED APPLICATION

This application is a continuation-in-part of co-pending U.S. patent application Ser. No. 8/324,069, filed Oct. 14, 1994 now abandoned.

BACKGROUND OF THE INVENTION

This invention relates to generators and methods for providing increased generator output, and more particularly toward brushless generators having air-core coils in place of iron-core windings in regions of the generator that are exposed to high frequency magnetic fields.

The use of brushless generators is well known throughout various industries. For example, many automobile manufacturers utilize brushless generators to provide electrical power to vehicles. Prior brush-type generators suffered from a variety of problems related to the brushes (e.g., frequent maintenance and reduced lifespan due to the physical wearing of the brushes as they contacted the commutator bars).

In brushless generators, an exciter winding is fed a small input signal which induces a much larger signal in a rotating member. The input signal, which may be a DC current or a low frequency AC current, causes an AC current to be induced in the rotating member. The AC current is converted to DC by a rectifier assembly which is typically located within the rotating member. One example of a known rotating rectifier is described in Pinchott U.S. Pat. No. 5,065,484. The rectified DC current flows through the main windings (on the rotating member) and creates a large rotating magnetic field. The rotating field interacts with the main armature to generate a large AC signal in the armature windings. This large AC signal, which is delivered to the external load, may be effectively 10,000 times greater than signal that was input to the exciter.

In some instances, the exciter may itself be excited by a permanent magnet generator (PMG). One known example of an alternator which utilizes PMGs is described in Farr U.S. Pat. No. 4,654,551. Farr's magnetic flux field is generated by a rotating permanent ring and a toroidal control coil, where the toroidal control coil is mounted to add or subtract in the magnetic relationship with the ring.

As with most known electromagnetic devices, known brushless generators are typically manufactured using iron cores in both the exciter and main armatures. For example, Giuffrida U.S. Pat. No. 4,647,806 describes a brushless alternator having an exciter armature formed from a laminated stack of steel plates. Because the armatures are formed from laminated stacks of steel or iron plates, the armature cores tend to resemble a solid drum of iron. In view of the fact that one armature core is typically a rotating component in a brushless generator, any additional weight due to the materials used may cause premature degradation of the rotating member's bearings.

The potential for increased friction and wear on the bearings becomes even greater as the rotational speed of the generator increases. A desired increase in rotational speed is a growing trend in industry due to the fact that the output of the rotating machine tends to increase as rotational speed increases. In order to achieve greater rotational speeds, engineers must design brushless generators that are smaller and more compact than traditional designs (to simplify and reduce the effects of the higher speeds).

One known method for addressing bearing wear is to replace the conventional bearings with magnetic bearings. Unfortunately, the magnetic instability of the iron core armature would compete with the stabilizing magnetic forces of the magnetic bearing. As such, the magnetic bearing would have to be large to overcome the generator's magnetic forces.

Additional deficiencies have also been encountered in attempting to design higher speed rotational machines. One of these deficiencies is related to the use of iron cores in the armatures. As the rotational speed increases, core losses due to hysteresis and eddy-currents (collectively referred to as simply "core losses") tend to reduce the efficiency of the machines. For example, hysteresis losses tend to increase linearly with respect to frequency, while eddy-current losses tend to increase with the square of frequency. As the frequency of the machine exceeds about 24,000 rpm, the core losses may begin to offset the benefits of increases in frequency. In fact, at frequencies nearing 50,000 rpm, the core losses may be intolerable, causing the device to essentially fail.

In view of the foregoing, it is an object of this invention to provide improved brushless generators which operate at high frequencies and reduced core losses.

It is also an object of the present invention to provide improved brushless generators having reduced forces on the rotational member to increase device life.

It is also a further object of this invention to provide methods for reducing the effects of core losses on high speed rotating machines.

It is a still further object of the present invention to provide improved brushless generators having high power density in comparison to tradition iron core generators.

A single-stage brushless generator having some of the features set forth in the preamble portion of present claim 1 is known from document DE-C-954 978.

SUMMARY OF THE INVENTION

These and other objects of the invention are accomplished in accordance with the principles of the invention by providing brushless generators which utilize an "air-core" coil in place of the traditional ferrous core in regions of the device that operate at high frequencies. The air-core coil is a non-magnetic coil of wire which, when exposed to magnetic fields, may have a voltage or current induced therein (i.e., no ferrous material is used). By removing iron from the high frequency fields in the device, the effects of core losses are virtually eliminated, thus allowing the device to efficiently operate at significantly higher rotational speeds.

The brushless generator of the present invention includes an exciter stage and main stage. The exciter stage includes a set of air-core coils attached to a rotating shaft which moves the cores through a DC field created by stationary electromagnets (to which a small DC current or low frequency AC current is applied, the low frequency AC current may be approximately within the range of 1–400 hz). The movement of the loops through the field generates an amplified AC current in the loops (due to the changing flux through the center of the loops). The AC current is rectified to DC, preferably by a rectifier which is mounted within the rotating shaft.

The amplified DC current (which is approximately ten times greater than the input current) is applied to a set of rotating electromagnets in the main stage (the electromagnets are also attached to the shaft). The rotating electromagnets create another magnetic field, approximately ten times greater than the exciter stage field, which is applied to a set of stationary air-core coils. In the main stage, an amplified voltage is generated in the coils which may be output (as either AC, or rectified into DC). In this case, the power of the output signal would be approximately 10,000 times greater than the power of the input signal (i.e., the voltage is increased by 100 and the current is increased by 100, therefore, in accordance with Ohm's Law, the power must be increased by 10,000). Those skilled in the art will appreciate that the most significant cores losses occur in the main stage and, therefore, although it may be beneficial to include air-core coils in the exciter stage, it is by no means a requirement of the principles of the present invention to do so.

In one preferred embodiment, the coils and electromagnets are aligned such that radially directed magnetic fields are created. In this case, the length of the air-core coils runs parallel to the axis of the rotating shaft. Alternatively, the coils and electromagnets may be aligned such that axially directed magnetic fields are created. In that case, the length of the air-core coils runs perpendicular to the axis of the rotating shaft. In either case, the operation of the rotating machine is essentially the same as described above. In addition, the main stage may be used to create the rotating fields of a brushless motor (in place of the permanent magnets) without departing from the spirit of the invention. In that instance, the fields of the device may be turned off when the motor is not producing torque, thereby reducing losses in the device while in standby mode.

The use of air-core coils in place of iron cores in regions which experience high frequency magnetic fields virtually eliminates core losses. Additionally, the air-core coils have significantly reduced mass when compared to the iron cores, thereby reducing the size and weight of the armature shell. This results in reduced wear and friction on the bearings, as well as permitting the overall device to be manufactured in a more compact manner. Further, if magnetic bearings are used in place of conventional bearings, the air-core coils virtually eliminate the competitive interaction between the armature and the bearing. Therefore, improved overall life of the rotating machine may be achieved.

Alternate embodiments are provided in which the overall gain is further increased. In one alternate embodiment, flux compression members are inserted between the air-core coils and the windings. The flux compression members increase the gain of the generator by lowering the inductive reactance of the applicable stage. Thus, a significant increase may be obtained by utilizing flux compression members in both the exciter and main stages. Another alternate embodiment provides further increased gain by placing the exciter stage radially outside of the main stage, preferably, with both stages being aligned radially.

Further features of the invention, its nature and various advantages will be more apparent from the accompanying drawings and the following detailed description of the preferred embodiments.

BRIEF DESCRIPTION OF THE DRAWINGS

FIG. 1 is a longitudinal cross-sectional view of a generator, in accordance with the principles of the present invention;

FIG. 2 is a radial cross-sectional view of the brushless generator of FIG. 1, taken from line 2—2 of FIG. 1;

FIG. 7 is a longitudinal cross-sectional view of an alternate embodiment of a brushless generator employing flux compression members, in accordance with the principles of the present invention;

FIG. 8 is a radial cross-sectional view of the brushless generator of FIG. 7, taken from line 8—8 of FIG. 7;

DETAILED DESCRIPTION OF THE PREFERRED EMBODIMENTS

Figure 3:
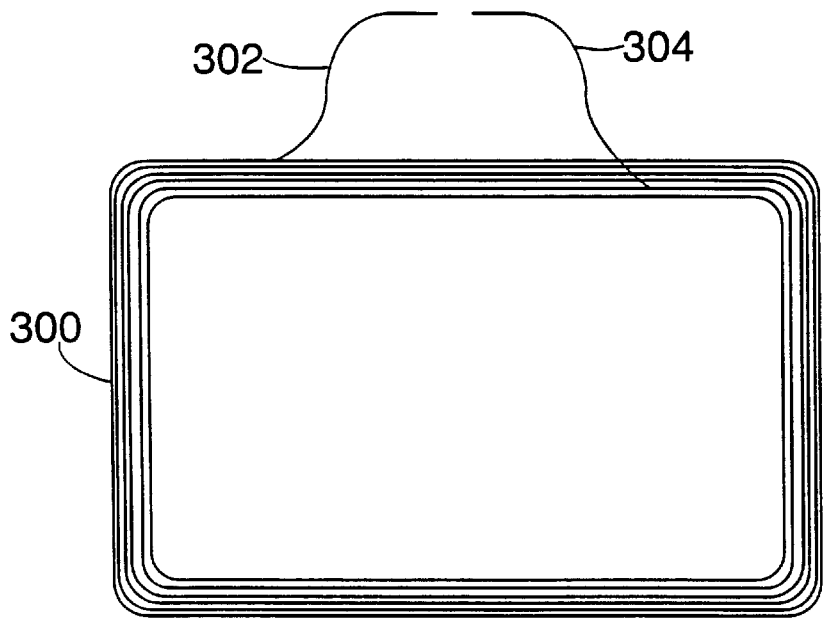
FIG. 3 is an elevational view of a typical air-core loop for a brushless generator, in accordance with the principles of the present invention.

Referring to FIG. 1, a preferred embodiment of a brushless generator 10 in accordance with the principles of the present invention is described. Brushless generator 10 includes a substantially cylindrical housing 12 having an opening 14 at one end and an annular wall 16 at the other end. Housing 12 may be formed as a single piece of high-strength fiber-epoxy, or it may be formed using multiple pieces of a non-magnetic material such as aluminum.

Mounted within the open end 14 of housing 12 is a rotor 18 to which is connected several components, as is described below, so that the components are located within housing 12. For ease of discussion, generator 10 is considered to be formed of two separate stages, exciter stage 20 and main stage 22. The input signal is typically fed into exciter stage 20, while the output signal is typically output from main stage 22.

Exciter stage 20 includes a plurality of stationary electromagnets 24 (for example, generator 10 has eight pairs of electromagnets 24) located at equidistant points about the circumference of rotor 18. Electromagnets 24 may comprise ferrous core 26 surrounded by windings 28. Windings 28 are coupled to control lines 34 which receive the input signals to generator 10, as is described more fully below.

Core 26 may be formed from a laminated stack of magnetic material such as soft iron or steel (such that the material is only magnetized in the presence of a magnetic field). Alternatively, core 26 may be formed from a solid magnetic material such as ferrite, or any other suitable material. Electromagnets 24 are arranged in pairs which may be referred to as inner electromagnets 30 and outer electromagnets 32.

Exciter stage 20 also includes a plurality of electrically conductive, non-magnetic, air-core loops 36 embedded within a tube 38, which forms the armature of the exciter. Although it is preferable that the armature of the exciter be formed with air-core loops, the brushless generator of the present invention will also be effective with traditional iron-core components in the exciter armature. Tube 38 is fixedly mounted to rotor 18 such that when rotor 18 rotates, the plurality of air-core loops 36 are rotated about an axis 40 (which is parallel to the longtitudal axis of generator 10) between inner electromagnets 30 and outer electromagnets 32. The rotational axis of rotor 18 may be connected to a motor or prime mover (not shown) through a thrust bearing (not shown) to improve the efficiency of the rotational movement by absorbing the potentially large reactional forces that may be applied to rotor 18 during normal operation.

Main stage 22 includes a plurality of electromagnets 42 which are radially mounted to, and at equidistant points about, rotor 18. It is preferable, but not essential, that there be the same number of electromagnets 42 in main stage 22 as there are electromagnets 24 in exciter stage 20. Electromagnets 42 are substantially similar to electromagnets 24 and thus, may also be comprised of a ferrous core 46 surrounded by windings 48. Unlike windings 28, windings 48 are coupled to conversion lines 44 which receive the input signals from conversion circuitry 50. Conversion circuitry converts AC signals to DC signals, as described below, and may include any conventional rectification circuit (for example, a full-wave bridge rectifier). Alternatively, conversion circuitry 50 may also include a parallel capacitor (not shown) to condition the pulsating DC signal into a smoother DC signal.

Core 46 may also be formed from a laminated stack of magnetic material such as soft iron or steel (such that the material is only magnetized in the presence of a magnetic field). Alternatively, core 46 may be formed from a solid magnetic material such as ferrite, or any other suitable material. Electromagnets 42 are arranged in pairs which, for reference purposes, may be referred to as inner electromagnets 60 and outer electromagnets 62 (this representation is shown more clearly in FIG. 2, the radial cross-section view of generator 10).

Main stage 22 also includes a plurality of electrically conductive air-core loops 56 embedded within a tube 58 which is fixedly mounted to annular wall 16. In main stage 22, when rotor 18 rotates, the plurality of electromagnets 42 are rotated about axis 40 such that air-core loops 56 are located between inner electromagnets 60 and outer electromagnets 62. Conductive air-core loops 56 are coupled to output lines 64, which provide the output signal from generator 10.

As previously described, the use of air-core coils provides virtual elimination of the effects of core losses. However, a further advantage of the air-core coils of the present invention results in the substantially reduced size, and therefore mass, of the armature coils with respect to the overall size of the generator. For example, the ratio of the thickness of air-core coil 56 (i.e., radial length) to the diameter of generator 10 is approximately 40. For effective operations, the diameter of the brushless generator should be at least approximately twenty times greater than radial length of the air-core coils. (The reference point of the air-core coil is rotated by 90° for the brushless generators shown in FIGS. 4–7, so that the radial length of the generator is compared to the axial length of the air-core coils.)

FIG. 2 shows a radial cross-sectional view of brushless generator 10. More specifically, FIG. 2 shows electromagnets 42 being configured with a plurality of individual poles 66—eight poles in the present case, but the number of poles is not intended to in any way limit the scope of the invention. The number of poles selected for a given brushless generator is related to the size (i.e., diameter) and terminal inductance of the loops. FIG. 2 also shows poles 66 being alternating labeled in polarity (N designating north and S designating south). It should be clear to the practitioner that the poles are normally neutral and that polarity is only induced in the poles 66 when current is applied to windings 48.

As shown in FIGS. 1 and 2, each pole 66 has a corresponding air-core loop 56 which spans the longitudinal length of electromagnet 42. The air-core loops 56 are embedded in tube 58 with only a small circumferential gap between each air-core loop 56 such that the plurality of air-core loops 56 essentially comprises a cylinder. The motor or prime mover (not shown) rotates rotor 18, and therefore electromagnet 42, along a rotational axis 40.

Each air-core loop (including loops 36, 56, 436, 456, 736, 756, 836, and 856, as shown in the figures) may be a unitary piece of solid electrically conductive material, but preferably air-core loop is made up of turns of wire consisting of a plurality of electrical conductors which are electrically insulated from each other and are electrically connected together in parallel. One such wire, known as litz wire, is constructed of individual film-insulated wires which are bunched or braided together in a uniform pattern of twists and length of lay. This configuration reduces skin effect power losses of solid conductors, or the tendency of radio frequency current to be concentrated at the conductor surface. Properly constructed litz wires have individual strands each positioned in a uniform pattern moving from the center to the outside and back within a given length of the wire.

The manner in which conductive air-core loops 36 affect brushless generator 10 is now described (this description is equally applicable to air-core loop 56 in main stage 22, as well as the other air-core loops described herein, except that a voltage is induced in the non-rotating air-core loops rather than a current). Essentially, when current is applied to windings 28, magnetic fields are generated between inner electromagnets 30 and outer electromagnets 32. As air-core loops 36 rotate (on axis 40) through the fields, the relative motion between air-core loops 36 and electromagnets 24 produces an electromotive force (i.e., a voltage around each of the conductive loops) which induces current in air-core loops 36. Thus, a voltage is induced in exciter stage 20 without the use of iron in the armature (which is the high frequency portion of the exciter).

It should be apparent to persons skilled in the art that a simple removal of ferrous material from the armature core of a conventional brushless generator would not produce a generator which could operate effectively. Further modifications of the armature must also be made as described herein for proper operation. For example, the diameter of the brushless generator should be at least approximately twenty times greater than the radial length of the air-core coils (as described above) and the axial length of the ferrous core of the electromagnet should be at least approximately three times greater than the radial length of the air-coil core (as describe below).

The operation of one of the preferred embodiments of the brushless generator will now be described. Brushless generator 10 operates by providing a small DC input signal or a low frequency AC input signal, such as one watt, to input lines 34 while rotor 18 is rotating about axis 40. The input signal is fed to windings 28 which energize stationary electromagnets 24, thereby creating small, radially-directed, DC magnetic fields. At the same time, rotor 18 rotates air-core loops 36 through the generated DC fields and thus, as described above, AC currents are induced in the air-core loops 36.

The induced AC currents are fed, through exciter output lines 70, to conversion circuitry 50. The conversion circuitry converts the AC signal to a DC signal such that the input power is amplified by the exciter stage by a factor of approximately 100. It should be noted that the amplification factor increases rapidly with respect to rpm. For effective amplification, the axial length of core 46 of electromagnet 42 should be at least approximately three times greater than the radial length of air-coil core 56. The greater the ratio, the greater the amplification. (The reference points are rotated by 90° for the brushless generator shown in FIGS. 4–6, so that the radial length of the electromagnet is compared to the axial air gap.)

Similarly, the amplified DC signal is fed to the windings 48 of rotating electromagnets 42. The amplified DC signal energizes electromagnets 42, thereby creating a second set of radially-directed DC fields which, in this case, are rotating about axis 40. Because air-core loops 56 are located in the rotating fields, in a manner similar to the interaction between electromagnets 24 and air-core loops 36, AC voltages are induced in air-core loops 56. These induced voltages are provided as outputs from generator 10 at output lines 64. Due to the dual amplification (each stage amplified the power of the signal input to it by a factor of 100), the power of the final output signal is approximately 10,000 times greater than the small signal which was input to exciter 20.

FIG. 3 shows an elevational view of an air-core loop 300. Loop 300 may be formed of individual film-insulated wires (e.g., litz wire) which are bundled together in a uniform pattern, as described above. A single strand of loop 300 is broken to form two ends 302 and 304 (i.e., merely the beginning and end of the series wound loop 300) which are connected to provide an output signal from the loop. Loop 300 is representative of any one of loops 36 (i.e., the exciter loops) and loops 56 (i.e., the main loops) shown in FIGS. 1 and 2, or the air-core loops shown in FIGS. 4–10. Additionally, a capacitor (not shown) may be installed in series with the loop to reduce impedance, if necessary.

Figure 4:
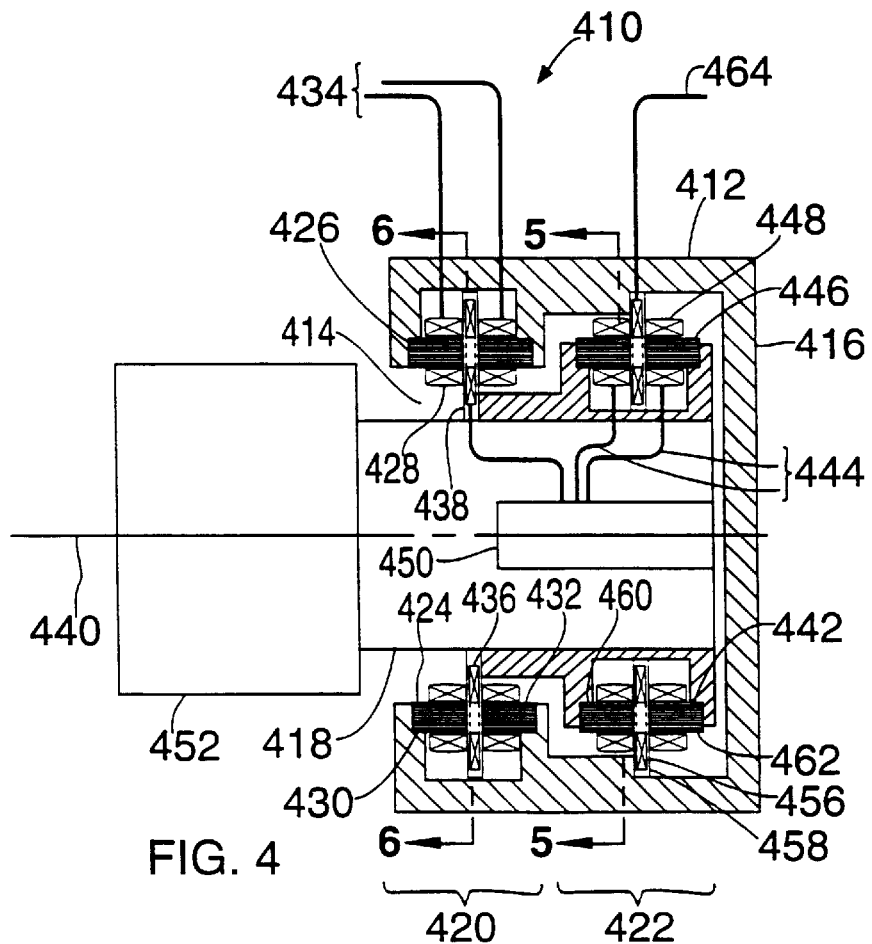
FIG. 4 is a longitudinal cross-sectional view of an alternate embodiment of a brushless generator, in accordance with the principles of the present invention.

An alternate preferred embodiment of the present invention is shown in FIG. 4, for which a brushless generator 410 is now described. Brushless generator 410 may be constructed in accordance with many of the principles discussed above regarding brushless generator 10 (of FIG. 1). One difference between generators 10 and 410 is that generator 410 generates axially directed fields, while generator 10 generates radially directed fields (therefore, as described above, the radial length of the core of the electromagnets must be greater then the axial air-gap between the pairs of electromagnets). In other respects, the two generators are essentially the same.

Brushless generator 410 includes a substantially cylindrical housing 412 having an opening 414 at one end and an annular wall 416 at the other end. Housing 412 may be formed as a single piece of high-strength fiber-epoxy, or it may be formed using multiple pieces of a non-magnetic material such as aluminum.

Mounted within the open end 414 of housing 412 is a rotor 418 to which is connected several components, as is described below, so that the components are located within housing 412. For ease of discussion, generator 410 is considered to be formed of two separate stages, exciter stage 420 and main stage 422. The input signal is typically fed into exciter stage 420, while the output signal is typically output from main stage 422.

Exciter stage 420 includes a plurality of stationary electromagnets 424 (for example, brushless generator 410 has eight pairs of electromagnets 424) located at equidistant points about the circumference of rotor 418. Electromagnets 424 may comprise ferrous core 426 surrounded by windings 428. Windings 428 are coupled to control lines 434 which receive the input signals to generator 410, as is described more fully below.

Core 426 may be formed from a laminated stack of magnetic material such as soft iron or steel (such that the material is only magnetized in the presence of a magnetic field). Alternatively, core 426 may be formed from a solid magnetic material such as ferrite, or any other suitable material. Electromagnets 424 are arranged in pairs which may be referred to as distal electromagnets 430 and proximal electromagnets 432 (where distal and proximal refer to the position of the electromagnets relative to annular wall 416).

Exciter stage 420 also includes a plurality of electrically conductive air-core loops 436 embedded within a disk 438, which forms the armature of the exciter. Although it is preferable that the armature of the exciter be formed with air-core loops, the brushless generator of the present invention will also be effective with traditional iron-core components in the exciter armature. Disk 438 is fixedly mounted to rotor 418 such that when rotor 418 rotates, the plurality of air-core loops 436 are rotated about an axis 440 (which is parallel to the longtitudal axis of brushless generator 410) between distal electromagnets 430 and proximal electromagnets 432. The rotational axis of rotor 418 is connected to a motor 452 (or other conventional driver) through a thrust bearing (not shown) to improve the efficiency of the rotational movement by absorbing the potentially large reactional forces that may be applied to rotor 418 during normal operation.

Main stage 422 includes a plurality of electromagnets 442 which are radially mounted to, and at equidistant points about, rotor 418. It is preferable, but not essential, that there be the same number of electromagnets 442 in main stage 422 as there are electromagnets 424 in exciter stage 420. Electromagnets 442 are substantially similar to electromagnets 424 and thus, may also be comprised of a ferrous core 446 surrounded by windings 448. Unlike windings 428, windings 448 are coupled to conversion lines 444 which receive the input signals from conversion circuitry 450. Conversion circuitry converts AC signals to DC signals, as described above, and may include any conventional rectification circuit (for example, a full-wave bridge rectifier). Alternatively, conversion circuitry 450 may also include a parallel capacitor (not shown) to condition the pulsating DC signal into a smoother DC signal.

Core 446 may also be formed from a laminated stack of magnetic material such as soft iron or steel (such that the material is only magnetized in the presence of a magnetic field). Alternatively, core 446 may be formed from a solid magnetic material such as ferrite, or any other suitable material. Electromagnets 442 are arranged in pairs which, for reference purposes, may be referred to as distal electromagnets 460 and proximal electromagnets 462 (once again, with the reference point being annular wall 416).

Main stage 422 also includes a plurality of electrically conductive air-core loops 456 embedded within a disk 458 which is fixedly mounted to the circumference of housing 412 such that disk 458 is located between distal electromagnets 460 and proximal electromagnets 462. Thus, when rotor 418 rotates, the plurality of electromagnets 442 are rotated about axis 440 such that air-core loops 456 are located between distal electromagnets 460 and proximal electromagnets 462. Conductive air-core loops 456 are coupled to output lines 464, which provide the output signal from generator 410.

Figure 5:
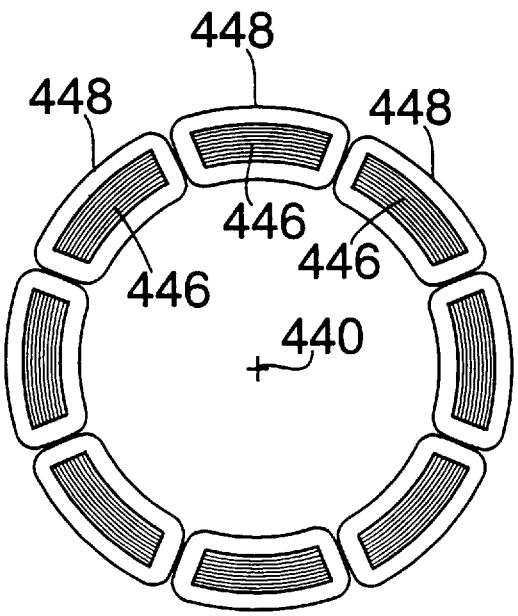
FIG. 5 is a radial cross-sectional view of the brushless generator of FIG. 4, taken from line 5—5 of FIG. 4.

FIG. 5 shows a radial cross-sectional view of distal electromagnets 460 of brushless generator 410. More specifically, FIG. 5 shows the manner in which windings 448 are wound around core 446 and that the plurality of electromagnets are located at equidistant positions circumferentially about axis 440.

Figure 6:
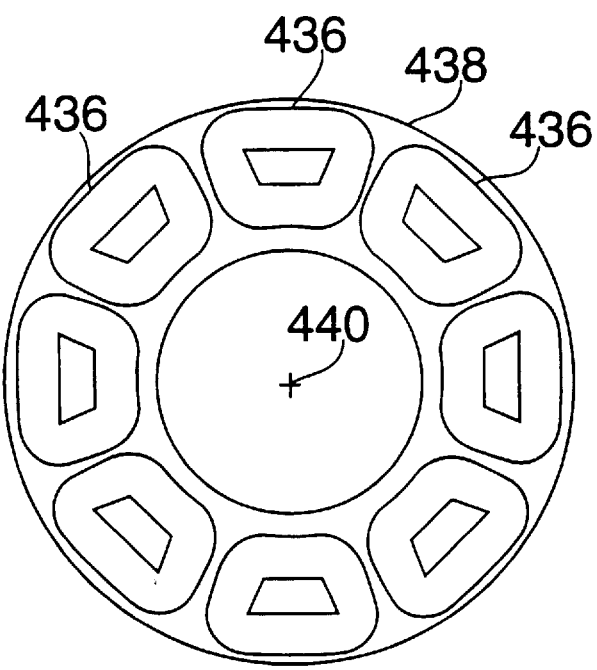
FIG. 6 is a radial cross-sectional view of the brushless generator of FIG. 4, taken from line 6—6 of FIG. 4.

FIG. 6 shows a radial cross-sectional view of air-core loops 436 embedded within disk 438. More specifically, FIG. 6 shows the manner in which the air-core loops are placed within disk 438 such that the loops 436 essentially comprise a flat cylinder which is rotated about axis 440.

The operation of brushless generator 410 is essentially identical to that described above for brushless generator 10. The primary difference between the two being the orientation of the air-core loops and the electromagnets. Because the longtitudal axis of air-core loops 436 and 456 extend radially from rotor 418, rather than parallel to axis 440 (as is the case with generator 10 and air-core loops 36 and 56), and the orientation of electromagnets 424 and 442, the magnetic fields in generator 410 are generated axially, with respect to axis 440 (rather than radially as described above for generator 10). otherwise, the operation is essentially identical.

As in brushless generator 10, a small DC input current or low frequency AC current is applied to inputs 434, to which the power is amplified by exciter stage 420 by a factor of approximately 100. The amplified AC current which is output from exciter 420 is converted to DC by conversion circuit 450 and input to main stage 422. The main stage amplifies the current to produce an AC voltage which, in this case, also has its power amplified by a factor of 100. Thus, brushless generator 410 provides an output signal which is approximately 10,000 times greater in power than the small input signal which was applied to inputs 434.

FIG. 7 shows another preferred embodiment of the present invention in brushless generator 710. Brushless generator 710 is substantially similar to brushless generator 10 (of FIG. 1), except for the addition of a pair of flux compression members in each stage, as described below. The flux compression members in each stage lower the inductive reactance of the armature coils of that stage, which provides a substantial increase in the gain of the brushless generator 710.

It should be noted that the use of air-core coils instead of iron-core coils in the armature results in a lower inductance brushless generator. The lower inductance enables the generator of the present invention to produce power at a very high power density (i.e., high power produced within a very small volume). The inductance may be lowered even further by the use of flux compression members. Thus, even though brushless generator 10 provides a significant amplification of input signals, that amplification can be further enhanced through the use of flux compression members.

The operation of brushless generator 710 is essentially the same as that described above for generator 10 of FIG. 1. As described above, it is preferable, but not required, to use air-core coils in the armature of the exciter stage. For simplicity, each of the components of brushless generator 710 are numbered using the same two-digits as the corresponding components in FIG. 1. Components in brushless generator 710 are labeled using a prefix of "7--." For example, the exciter stage in generator 10 is labeled as 20, while the exciter stage of generator 710 is labeled as 720. Thus, the functionality and structure of each of the individual components of generator 710 may be understood by referring to the description above for FIG. 1.

The significant exception to the above-described numbering scheme is the addition of flux compression members 780, 782, 784 and 786. Flux compression members 780 and 782 are employed within exciter stage 720 to reduce the terminal inductance (L) of air-core loops 736, while compression members 784 and 786 are employed within main stage 722 to reduce the terminal inductance (L) of air-core loops 756.

Flux compression members 780–786 may comprise a full cylinder of electrically conductive material, such as copper or any other suitable material, which is placed in the air gap between the tube containing the air-core loops (i.e., tubes 738 and 758) and the corresponding electromagnet assembly (i.e., electromagnets 724 and 742, respectively). Alternatively, flux compression members 780–786 may be formed of a number of discontinuous segments arranged to be coextensive with each pole of the electromagnet assembly. Members 780 and 782 should be stationary (because coils 736 rotate), and therefore, may simply be adhered to core 726, while members 784 and 786 may be adhered to core 746 such that they rotate about axis 740 (because coils 756 are stationary).

Any induced current flowing in loops 736 and 756 generates magnetic fields in the corresponding loops. These magnetic fields produce eddy currents in compression members 780 and 782, and 784 and 786, respectively, which in turn generate magnetic fields of opposing direction to those generated by the loops. The compression member fields tend to substantially cancel out the loop magnetic fields, thereby substantially reducing the terminal inductance of the loops, which increases the overall effectiveness of brushless generator 710.

FIG. 8 shows a radial cross-sectional view of brushless generator 710. More specifically, FIG. 8 shows electromagnets 742 being configured with a plurality of individual poles 766—eight poles in the present case, but the number of poles is not intended to in any way limit the scope of the invention. The number of poles selected for a given brushless generator is related to the size (i.e., diameter) and terminal inductance of the loops. FIG. 8 also shows poles 766 being alternating labeled in polarity (N designating north and S designating south). It should be clear to the practitioner that the poles are normally neutral and that polarity is only induced in the poles 766 when current is applied to windings 748.

As shown in FIGS. 7 and 8, each pole 766 has a corresponding air-core loop 756 which spans the longitudinal length of electromagnet 742. The air-core loops 756 are embedded in tube 758 with only a small circumferential gap between each air-core loop 756 such that the plurality of air-core loops 756 essentially comprises a cylinder. Flux compression members 784 and 786 are secured to electromagnets 742 such that the rotational movement of electromagnets 742 does not dislodge members 784 and 786. The motor or prime mover (not shown) rotates rotor 718, and therefore electromagnets 742, along rotational axis 740.

Figure 9:
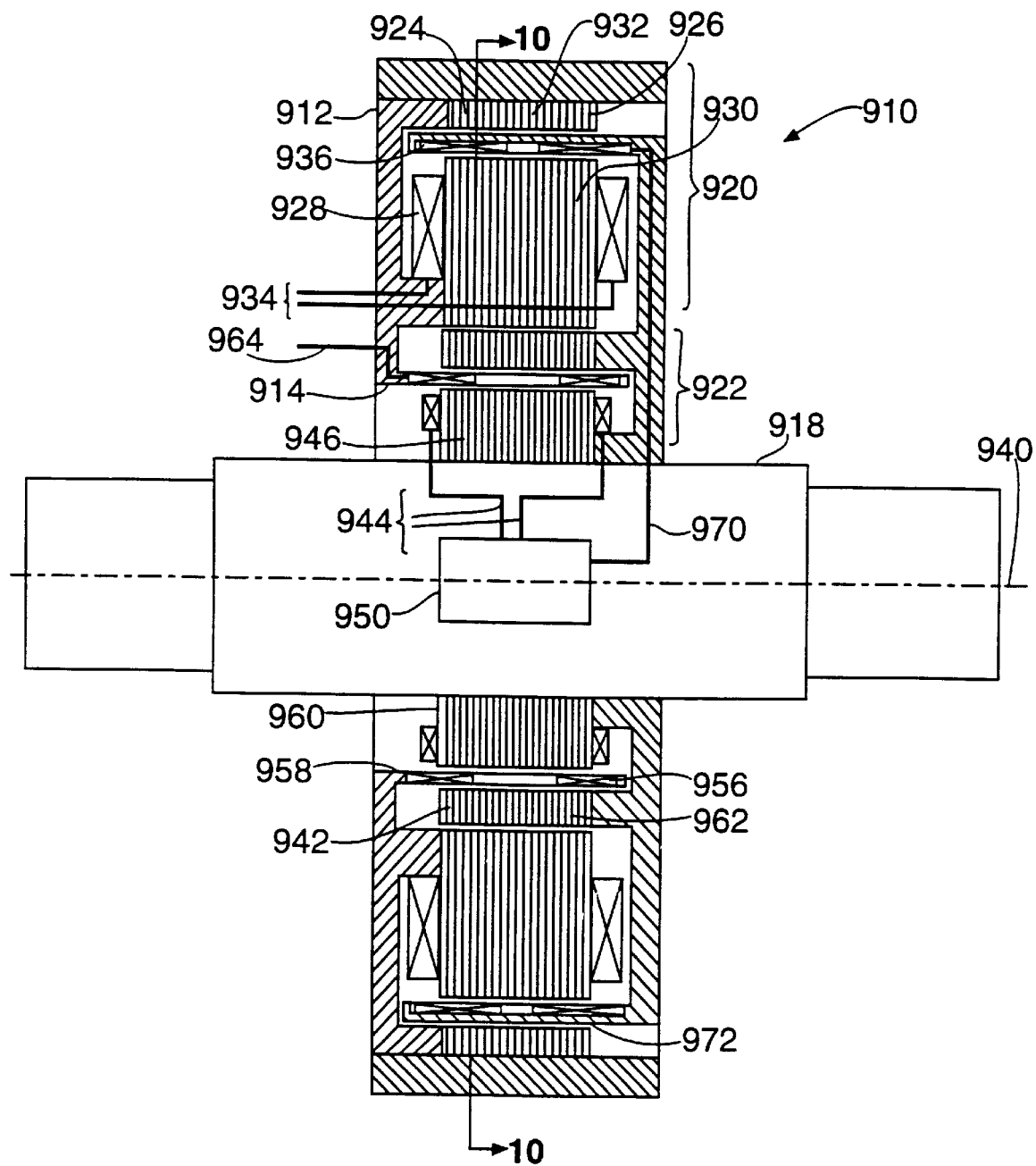
FIG. 9 is a longitudinal cross-sectional view of an alternate embodiment of a brushless generator in which the exciter stage is located radially outside of the main stage relative to the axis of rotation, in accordance with the principles of the present invention.

FIG. 9 shows another preferred embodiment of the present invention in radial brushless generator 910. Radial brushless generator 910 is substantially similar to brushless generator 10 (of FIG. 1), except that the exciter stage is located radially outside of the main stage. While FIG. 9 shows the exciter stage being substantially radially aligned with the main stage, the principles of the present invention may also be practiced by locating the exciter stage radially outside of the main stage without being radially aligned. For example, performance of generator 10 (of FIG. 1) may be improved by enlarging the radius of exciter stage 20 beyond that of main stage 22 without any axial adjustment (i.e., exciter stage 20 and main stage 22 maintain substantially the same axial positioning with respect to axis 40).

Expansion of the exciter stage radius increases the gain of the exciter stage due to the increase in tip speed (i.e., the product of the angular velocity and the radius of the object being rotated). The resulting gain of each stage is substantially proportional to the square of the relative speed of the stage rotating about the axis. Therefore, an exciter stage located at twice the diameter of a main stage produces approximately four times the gain of the main stage.

The exciter stage is able to withstand greater tip speeds because its rotational portion is the air-core armature which is formed from a high-strength composite, such as graphite-epoxy (glass fibers could also be used in place of graphite). Thus, cylindrical shell 972, to which loops 936 are mounted, is able to rotate at substantially higher relative speeds than rotating iron-cores 946.

The operation of brushless generator 910 is essentially the same as that described above for generator 10 of FIG. 1, except for the increased gain as described above. For simplicity, each of the components of brushless generator 910 are numbered using the same two-digits as the corresponding components in FIG. 1. Components in radial brushless generator 910 are labeled using a prefix of "9--." For example, the exciter stage in generator 10 is labeled as 20, while the exciter stage of generator 910 is labeled as 920. Thus, the functionality and structure of each of the individual components of generator 910 may be understood by referring to the description above for FIG. 1.

Figure 10:
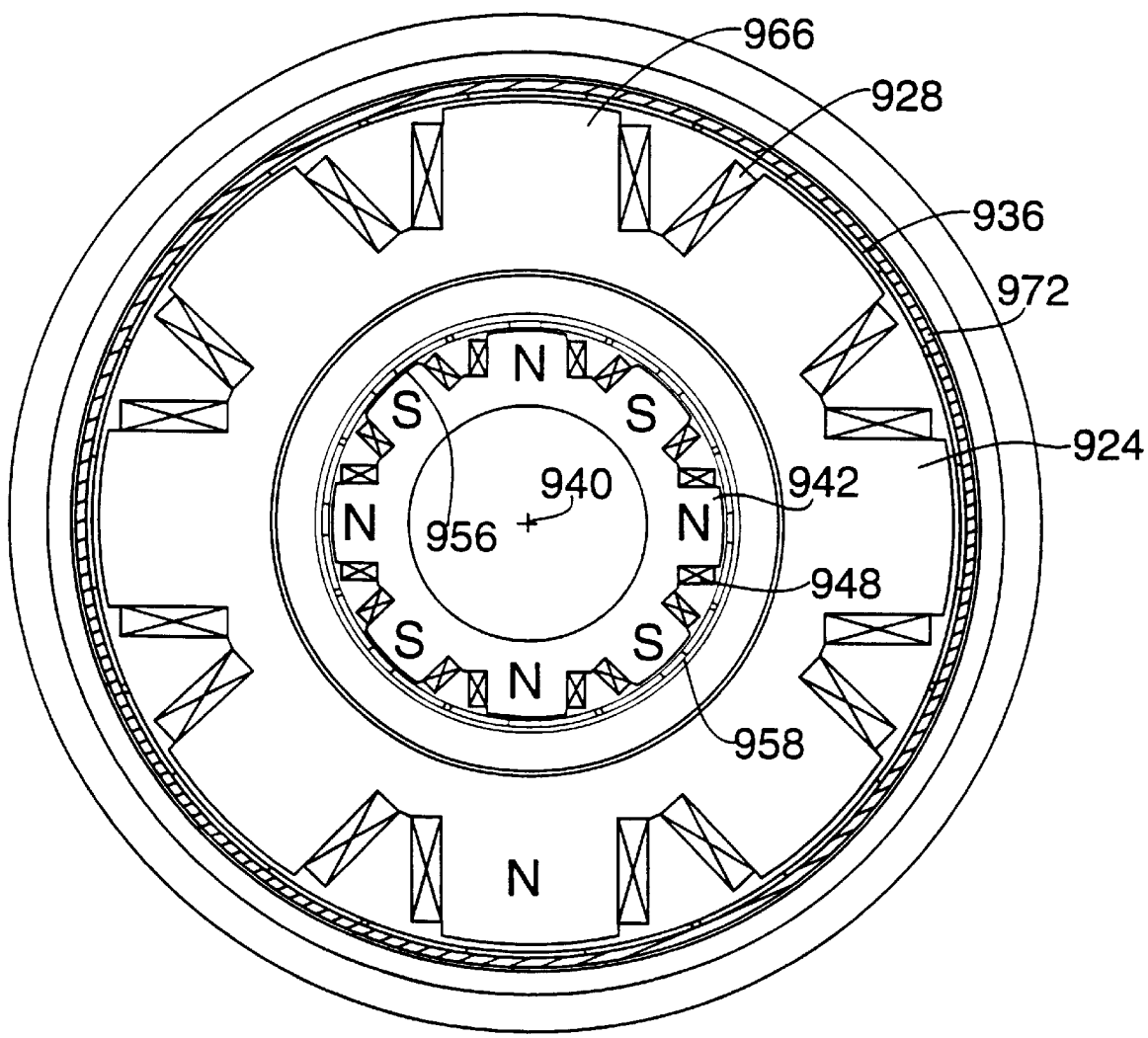
FIG. 10 is a radial cross-sectional view of the brushless generator of FIG. 9, taken from line 10—10 of FIG. 9.

FIG. 10 shows a radial cross-sectional view of brushless generator 910. More specifically, FIG. 10 shows electromagnets 942 being configured with a plurality of individual poles 966—eight poles in the present case, but the number of poles is not intended to in any way limit the scope of the invention. The number of poles selected for a given brushless generator is related to the size (i.e., diameter) and terminal inductance of the loops. FIG. 10 also shows poles 966 being alternating labeled in polarity (N designating north and S designating south). It should be clear to the practitioner that the poles are normally neutral and that polarity is only induced in the poles 966 when current is applied to windings 948.

As shown in FIGS. 9 and 10, each pole 966 has a corresponding air-core loop 956 which spans the longitudinal length of electromagnet 942. The air-core loops 956 are embedded in tube 958 with only a small circumferential gap between each air-core loop 956 such that the plurality of air-core loops 956 essentially comprises a cylinder. The motor or prime mover (not shown) rotates rotor 918, and therefore electromagnets 942, along rotational axis 940.

It will be understood that the foregoing is only illustrative of the principles of the invention, and that various modifications can be made by those skilled in the art without departing from the scope and spirit of the invention. For example, the main stage of the brushless generator may be used as the rotating fields of a brushless motor instead of the configuration which has been described.

I claim:

1. A brushless generator (10) having an input (34) and an output (64), said generator (10) comprising:

a stationary assembly including at least one non-rotating electromagnet (24) and at least one non-rotating air-core coil (56), said non-rotating electromagnet (24) producing at least one non-rotating magnetic field and having windings (28) coupled to said input (34), said non-rotating coil (56) being coupled to said output (64);

a rotating assembly including at least one rotating electromagnet (42) and at least one rotating coil (36), said rotating electromagnet (42) producing at least one rotating magnetic field which travels in a circular path such that said non-rotating air-core coil (56) is exposed to said rotating magnetic field, said rotating coil (36) travelling in a circular path through said non-rotating magnetic fields, said relative motion of said rotating coil (36) and said non-rotating magnetic field inducing an AC current in said rotating coil (36), and said relative motion of said non-rotating air-core coil (56) and said rotating magnetic field inducing an AC voltage in said non-rotating air-core coil (56);

a conversion circuit (50) mounted in said rotating assembly, said conversion circuit (50) having an input (70) coupled to said rotating coil (36) and having at least one output (44) coupled to windings (48) of said at least one rotating electromagnet (42), said conversion circuit (50) converting said AC current to a substantially DC current; and flux compression members (780, 782, 784 and 786) of electrically conductive material characterized in that said flux compression members (780, 782, 784 and 786) provide opposing magnetic fields which substantially cancel selected magnetic fields generated in said brushless generator (10).

2. The brushless generator of claim 1, wherein said at least one rotating coil is an air-core coil.

3. The brushless generator of claim 1, wherein said rotating electromagnet is oriented within said rotating assembly such that said rotating field is produced in a radial direction with respect to the axis of rotation of said rotating assembly.

4. The brushless generator of claim 3, wherein:

said non-rotating air-core coil has a radial length with respect to said axis of rotation of said rotating assembly; and said rotating electromagnet has a core having an axial length, with respect to said axis of rotation of said rotating assembly, which is at least three times greater than said radial length.

5. The brushless generator of claim 3, wherein:

said non-rotating air-core coil has a radial length with respect to said axis of rotation of said rotating assembly; and said generator has a radial length, with respect to said axis of rotation of said rotating assembly, which is at least ten times greater than said radial length of said non-rotating air-core coil.

6. The brushless generator of claim 2, further comprising exciter stage flux compression members comprising:

first and second cylinders of electrically conductive material, said non-rotating electromagnet having inner and outer cores with respect to said axis of rotation, said first cylinder being fixedly attached to said inner core between said inner core and said rotating coil, and said second cylinder being fixedly attached to said outer core between said outer core and said rotating coil, said flux compression members providing opposing magnetic fields which substantially cancel magnetic fields generated by current induced in said rotating coil.

7. The brushless generator of claim 1, further comprising main stage flux compression members comprising:

first and second cylinders of electrically conductive material, said rotating electromagnet having inner and outer cores with respect to said axis of rotation, said first cylinder being fixedly attached to said inner core between said inner core and said non-rotating coil, and said second cylinder being fixedly attached to said outer core between said outer core and said non-rotating coil, said flux compression members providing opposing magnetic fields which substantially cancel magnetic fields generated by current induced in said non-rotating coil.

8. The brushless generator of claim 6, further comprising main stage flux compression members comprising:

third and fourth cylinders of electrically conductive material, said rotating electromagnet having inner and outer cores with respect to said axis of rotation, said third cylinder being fixedly attached to said inner core of said rotating electromagnet between said inner core and said non-rotating coil, and said fourth cylinder being fixedly attached to said outer core of said rotating electromagnet between said outer core and said non-rotating coil, said main stage flux compression members providing opposing magnetic fields which substantially cancel magnetic fields generated by current induced in said non-rotating coil.

9. The brushless generator of claim 2, wherein said rotating coil and said rotating electromagnet rotate about an axis, said rotating coil having a substantially larger radius than said rotating electromagnet.

10. The brushless generator of claim 9, wherein said rotating coil and said rotating electromagnet are substantially aligned with each other in plane about said axis.

11. The brushless generator of claim 2, wherein said rotating coil is supported by a band of high-strength composite material.

12. The brushless generator of claim 1, wherein said rotating electromagnet is oriented within said rotating assembly such that said rotating field is produced in a axial direction with respect to the axis of rotation of said rotating assembly.

13. The brushless generator of claim 12, wherein:

said non-rotating air-core coil has an axial length with respect to said axis of rotation of said rotating assembly; and said rotating electromagnet has a core having a radial length, with respect to said axis of rotation of said rotating assembly, which is at least three times greater than said axial length.

14. The brushless generator of claim 12, wherein:

said non-rotating air-core coil has an axial length with respect to said axis of rotation of said rotating assembly; and said generator has a radial length, with respect to said axis of rotation of said rotating assembly, which is at least ten times greater than said axial length of said non-rotating air-core coil.

15. The brushless generator of claim 1, wherein said conversion circuit comprises a rectifier.

16. The brushless generator of claim 1, wherein:

said non-rotating electromagnet produces a plurality of magnetic fields which are spaced circumferentially from each other;

said rotating electromagnet produces a plurality of magnetic fields which are spaced circumferentially from each other;

said at least one non-rotating air-core coil comprises a plurality of air-core coils which are spaced circumferentially from each other; and said at least one rotating coil comprises a plurality of coils which are spaced circumferentially from each other.

17. The brushless generator of claim 16, wherein:

said plurality of magnetic fields produced by said non-rotating electromagnet which are circumferentially adjacent to each other have oppositely directed magnetic flux; and said plurality of magnetic fields produced by said rotating electromagnet which are circumferentially adjacent to each other have oppositely directed magnetic flux.

18. The brushless generator of claim 17, wherein the oppositely directed magnetic fluxes of said non-rotating electromagnet and said rotating electromagnet are directed radially with respect to the axis of rotation of said rotating assembly.

19. The brushless generator of claim 17, wherein the oppositely directed magnetic fluxes of said non-rotating electromagnet and said rotating electromagnet are directed axially with respect to the axis of rotation of said rotating assembly.

20. The brushless generator of claim 1, wherein:

said non-rotating electromagnet and said at least one rotating coil form an exciter stage that is coupled to said input for receiving and amplifying an input signal, said exciter stage producing at least one stationary magnetic field, said at least one rotating coil rotating about an axis through said stationary magnetic field such that an AC current is induced in said rotating coil; and said rotating electromagnet and said at least one non-rotating air-core coil form a main stage that is coupled to said output and to said conversion circuit, said main stage producing at least one rotating magnetic field, said at least one non-rotating air-core coil being exposed to said rotating magnetic field such that an AC voltage is induced in said non-rotating coil.

21. The brushless generator of claim 20, wherein said at least one rotating coil is an air-core coil.

22. The brushless generator of claim 20, wherein said input signal is a DC current.

23. The brushless generator of claim 20, wherein said input signal is a low frequency AC current.

24. The brushless generator of claim 20, wherein said rotating electromagnet is oriented within said main stage such that said rotating field is produced in a radial direction with respect to the axis of rotation of said rotating coil.

25. The brushless generator of claim 24, wherein:

said non-rotating air-core coil has a radial length with respect to said axis of rotation of said rotating coil; and said rotating electromagnet has a core having an axial length, with respect to said axis of rotation of said rotating coil, which is at least three times greater than said radial length.

26. The brushless generator of claim 21, further comprising exciter stage flux compression members comprising:

first and second cylinders of electrically conductive material, said stationary electromagnet having inner and outer cores with respect to said axis of rotation, said first cylinder being fixedly attached to said inner core between said inner core and said rotating coil, and said second cylinder being fixedly attached to said outer core between said outer core and said rotating coil, said flux compression members providing opposing magnetic fields which substantially cancel magnetic fields generated by current induced in said rotating coil.

27. The brushless generator of claim 20, further comprising main stage flux compression members comprising:

first and second cylinders of electrically conductive material, said rotating electromagnet having inner and outer cores with respect to said axis of rotation, said first cylinder being fixedly attached to said inner core between said inner core and said non-rotating coil, and said second cylinder being fixedly attached to said outer core between said outer core and said non-rotating coil, said flux compression members providing opposing magnetic fields which substantially cancel magnetic fields generated by current induced in said non-rotating coil.

28. The brushless generator of claim 26, further comprising main stage flux compression members comprising:

third and fourth cylinders of electrically conductive material, said rotating electromagnet having inner and outer cores with respect to said axis of rotation, said third cylinder being fixedly attached to said inner core of said rotating electromagnet between said inner core and said non-rotating coil, and said fourth cylinder being fixedly attached to said outer core of said rotating electromagnet between said outer core and said non-rotating coil, said main stage flux compression members providing opposing magnetic fields which substantially cancel magnetic fields generated by current induced in said non-rotating coil.

29. The brushless generator of claim 21, wherein said exciter stage has a substantially larger radius than said main stage.

30. The brushless generator of claim 29, wherein said exciter stage and said main stage are substantially aligned with each other in plane about said axis.

31. The brushless generator of claim 21, wherein said rotating coil is supported by a band of high-strength composite material.

32. The brushless generator of claim 24, wherein:

said non-rotating air-core coil has a radial length with respect to said axis of rotation of said rotating coil; and said generator has a radial length, with respect to said axis of rotation of said rotating coil, which is at least ten times greater than said radial length of said non-rotating air-core coil.

33. The brushless generator of claim 20, wherein said rotating electromagnet is oriented within said main stage such that said rotating field is produced in a axial direction with respect to the axis of rotation of said rotating coil.

34. The brushless generator of claim 33, wherein:

said non-rotating air-core coil has an axial length with respect to said axis of rotation of said rotating coil; and said rotating electromagnet has a core having an radial length, with respect to said axis of rotation of said rotating coil, which is at least three times greater than said axial length.

35. The brushless generator of claim 33, wherein:

said non-rotating air-core coil has an axial length with respect to said axis of rotation of said rotating coil; and said generator has a radial length, with respect to said axis of rotation of said rotating coil, which is at least ten times greater than said axial length of said non-rotating air-core coil.

36. The brushless generator of claim 20, wherein said conversion circuit comprises a rectifier.

37. The brushless generator of claim 20, wherein:

said non-rotating electromagnet produces a plurality of magnetic fields which are spaced circumferentially from each other;

said rotating electromagnet produces a plurality of magnetic fields which are spaced circumferentially from each other;

said at least one non-rotating air-core coil comprises a plurality of air-core coils which are spaced circumferentially from each other; and said at least one rotating coil comprises a plurality of coils which are spaced circumferentially from each other.

38. The brushless generator of claim 37, wherein:

said plurality of magnetic fields produced by said non-rotating electromagnet which are circumferentially adjacent to each other have oppositely directed magnetic flux; and said plurality of magnetic fields produced by said rotating electromagnet which are circumferentially adjacent to each other have oppositely directed magnetic flux.

39. The brushless generator of claim 20, wherein:

said exciter stage being formed such that said at least one rotating air-core coil rotates about said axis at a first radius through said stationary magnetic field; and said main stage being formed such that said at least one rotating electromagnet rotates about said axis at a second radius which is less than said first radius.

* * * * *